US008125173B2

(12) United States Patent
Terashima et al.

(10) Patent No.: US 8,125,173 B2
(45) Date of Patent: Feb. 28, 2012

(54) CONTROL SYSTEM FOR A LIFTING DEVICE

(75) Inventors: Kazuhiko Terashima, Toyohashi (JP); Takanori Miyoshi, Hamamatsu (JP); Hiroyasu Makino, Toyokawa (JP)

(73) Assignees: Sintokogio, Ltd., Aichi-Ken (JP); National University Corporation Toyohashi University of Technology, Aichi-Ken (JP)

( * ) Notice: Subject to any disclaimer, the term of this patent is extended or adjusted under 35 U.S.C. 154(b) by 501 days.

(21) Appl. No.: 12/227,633

(22) PCT Filed: May 22, 2007

(86) PCT No.: PCT/JP2007/060445
§ 371 (c)(1),
(2), (4) Date: Apr. 10, 2009

(87) PCT Pub. No.: WO2007/138932
PCT Pub. Date: Dec. 6, 2007

(65) Prior Publication Data

US 2010/0017013 A1 Jan. 21, 2010

(30) Foreign Application Priority Data

May 25, 2006 (JP) ................................ 2006-145212

(51) Int. Cl.

| | |
|---|---|
| ***G05F 1/10*** | (2006.01) |
| ***H02P 6/00*** | (2006.01) |
| ***G05B 11/01*** | (2006.01) |
| ***G05B 11/18*** | (2006.01) |
| ***G05B 5/01*** | (2006.01) |
| ***G05B 1/06*** | (2006.01) |
| ***G05D 23/275*** | (2006.01) |
| ***B66D 1/48*** | (2006.01) |
| ***G06F 7/00*** | (2006.01) |

(52) U.S. Cl. .................. 318/650; 318/400.29; 318/560; 318/590; 318/611; 318/632; 318/652; 254/270; 700/213

(58) Field of Classification Search ............ 318/400.29, 318/560, 590, 611, 632, 650, 652; 254/270; 700/213
See application file for complete search history.

(56) References Cited

U.S. PATENT DOCUMENTS 3,684,236 A * 8/1972 Lewis ............................ 251/28
4,488,925 A * 12/1984 Craig et al. .................. 156/351
(Continued)

FOREIGN PATENT DOCUMENTS

JP 63-165295 A 7/1988
(Continued)

OTHER PUBLICATIONS

International Search Report; PCT/JP2007/060445, 2 pages; Aug. 7, 2007.

*Primary Examiner* — Walter Benson
*Assistant Examiner* — Gabriel Agared
(74) *Attorney, Agent, or Firm* — Finnegan, Henderson, Farabow, Garrett & Dunner, L.L.P.

(57) ABSTRACT

A control system for a lifting device in which a load moves up or down or maintains its position by a rope that is wound up or down by the rotation of a servo motor. It includes a device for measuring a force, a first controller, a second controller and a switching device. A total force that is applied at the lower part of the rope caused by a force for controlling, the mass of the load, and the acceleration of the load is measured. The first controller, based on the measured force computes the direction and the speed of the servo motor, and outputs a signal to it. The second controller determines a stable condition using Popov's stability criterion. The switching device replaces the first controller with the second controller when the value that is measured by the measuring device becomes less than a threshold.

3 Claims, 7 Drawing Sheets

U.S. PATENT DOCUMENTS

| | | | | | |
|---|---|---|---|---|---|
| 5,186,695 | A * | 2/1993 | Mangseth et al. | ................ | 482/6 |
| 5,239,886 | A * | 8/1993 | Kohring | ........................ | 474/152 |
| 5,600,221 | A * | 2/1997 | Tomatsuri et al. | ............ | 318/632 |
| 6,450,321 | B1 * | 9/2002 | Blumenthal et al. | ....... | 198/459.8 |
| 7,438,251 | B2 * | 10/2008 | St. Germain et al. | ...... | 242/417.3 |
| 7,467,723 | B2 * | 12/2008 | Zaguroli, Jr. | .................. | 212/331 |
| 7,667,424 | B2 * | 2/2010 | Tsuchiya | ...................... | 318/652 |
| 2008/0265225 | A1 * | 10/2008 | Miyoshi et al. | ............... | 254/266 |

FOREIGN PATENT DOCUMENTS

| | | | |
|---|---|---|---|
| JP | 64-43097 | A | 2/1989 |
| JP | 11147699 (A) | | 6/1999 |
| JP | 2000-271177 | A | 10/2000 |
| JP | 2001-2399 | A | 1/2001 |
| JP | 2003-81599 | A | 3/2003 |
| WO | WO 2006/054712 | A1 | 5/2006 |

* cited by examiner (a) Limit-cycle oscillation (b) Absolute stable

CONTROL SYSTEM FOR A LIFTING DEVICE

TECHNICAL FIELD

This invention relates to a control system for a lifting device. More specifically, the device relates to a system for controlling the rotation of a servo motor so that an operator can move a load in a direction and at a speed that he or she desires by adding a force for controlling to the load. The load is hoisted up or down or stays at its position by means of a rope. The rope is wound up and down by the rotation of the servo motor in the forward or the reverse direction.

BACKGROUND OF THE INVENTION

One existing control system for this kind of lifting device comprises a mechanism that lifts a load, a source for driving that drives the mechanism, a control portion that controls the source, and a portion for manipulation. The sensor that is provided in the portion for manipulation detects the force of an operator for holding up a load in the direction opposite to that of the pull of gravity when an operator holds the portion for manipulation and intends to lift the load. Then, the device amplifies its power for lifting in accord with the operator's force for holding it up. Thus it is lifted by both the force for holding up the load and the power for hoisting. The device controls the supply of air to a cylinder (i.e., a source for driving), so that the ratio of the power for lifting to the force for holding up the load is constantly or nearly constantly increased, as the force for holding up it is increased (see Japanese Patent Laid-open No. H11-147699).

DISCLOSURE OF THE INVENTION

In the conventional control system that is comprised as above, the direction of the speed and the direction of the movement of a load are output by handling a control lever that is located apart from the load. Therefore, the operator cannot simultaneously hold the load and handle the control lever. Accordingly, there is a problem in that he or she cannot lift the load with a good judgment for also handling the load.

This invention is aimed to resolve these drawbacks. Its purpose is to provide a control system for a lifting device that can lift a load that enables the operator to have a good judgment for handling the load, since an operator can simultaneously hold and control the load.

To resolve these drawbacks, the control system of the lifting device of this invention controls the rotation of a servo motor so that an operator can move a load in a direction and at a speed that he or she desires by applying a force for controlling to the load. The load is hoisted up or down or stays in its position by means of a rope. The rope is wound up or down by the rotation of the servo motor in the forward or reverse direction. The system comprises a means for measuring a force, a first controller means, a second controller means, and a switching means. The means for measuring measures the force that is applied at the lower part of the rope. The total force is caused by a force for controlling that is generated by the operator, the mass of the load, and the acceleration of the load. In the first controller means, based on the force that is measured by the means for measuring, an arithmetic part computes the direction and the speed of the servo motor, and outputs a signal to the servo motor to have it operate. The second controller means comprises an arithmetic part. The arithmetic part determines a stable condition using a criterion for nonlinear stability. Under this condition, when the load touches the ground, the input and output signals of the servo motor, which motor rotates in the forward and the reverse direction, are stable. The arithmetic part computes the direction and the speed of the servo motor, and outputs a signal to the servo motor to have it operate. The switching means replaces the first controller means with the second controller means, at the right time, namely, when the value that is measured by the means for measuring becomes less than the threshold.

In the device constructed as above, when an operator applies a force to the load in order to get it to move up or down, as he or she desires, the means for measuring the force measures the total force caused by the force applied by the operator, by the mass of, and acceleration of, the load. Then the means sends the result of the measurement to the controller means. In accord with this result, the controller means computes the corresponding direction and the speed that the servo motor should rotate, and sends these data points to the servo motor. Thus, the force corresponding to the force applied by the operator will be applied to the load and it will move in the desired direction and speed.

Further, at the right time, namely, when the value that is measured by the means for measuring becomes less than the threshold, the switching means replaces the first controller means with the second controller means. Thus, the phenomenon is prevented whereby the load moves up when it touches the ground.

In this invention, the arithmetic part stores data on a controller $K_1$, which is expressed by the equation $K_f=k_p(bs+\omega_n^2)/(s^2+2\omega_n s+\omega_n^2)$, and a controller $K_2$, which fulfills the conditions of stability, i.e., $b\geqq\omega_n/2\zeta$. At the arithmetic part, the controller $K_1$ computes a prescribed lifting speed in a minimum time based on the information from the means for measuring a force. The information is that of the total force caused by the force applied by the operator, the mass of the load, and the acceleration of the load. Then, the controller $K_1$ send instructions for driving to the servo motor. Next, at the right time, namely, when the value that is measured by the means for measuring becomes less than the threshold, the controller $K_1$ is replaced by the controller $K_2$ by instructions from the switching means.

In this invention, the arithmetic part stores data on the controller $K_2$, which is expressed by the equation $b\geqq\omega_n/2\zeta$. Therefore, at the right time, namely, when the value that is measured by the means for measuring becomes less than the threshold, the switching means can replace the first controller means with the second controller means. Thus, the phenomenon is prevented whereby the load moves up when it touches the ground.

As discussed above, this invention controls the rotation of a servo motor so that an operator can move a load in a direction and at a speed that he or she desires by applying a force for controlling to the load. The load is hoisted up or down or keeps its position by means of a rope. The rope is wound up or down by the rotation of the servo motor in the forward or the reverse direction. The system comprises a means for measuring a force, a first controller means, a second controller means, and a switching means. The means for measuring measures the force that is applied at the lower part of the rope. The force is caused by the force for controlling of the operator, the mass of the load, and the acceleration of the load. In the first controller means, based on the force that is measured by the means for measuring, an arithmetic part computes the direction and the speed of the servo motor, and outputs a signal to the servo motor to have it operate. The second controller means comprises an arithmetic part. The arithmetic part determines a stable condition using a criterion for nonlinear stability. Under this condition, when the load touches the ground, the input and output signals of the servo motor, which motor rotates in the forward and the reverse direction, are stable. The arithmetic part computes the direction and the speed of the servo motor, and outputs a signal to the servo motor to have it operate. At the right time, namely, when the value that is measured by the means for measuring becomes less than the threshold, the switching means replaces the first controller means with the second controller means. Therefore, the invention brings excellent and practical effects such that the operator can simultaneously hold and operate a load, etc. Also, he or she can lift a load in whatever direction and speed that he or she desires, with a good judgment for handling the load. Further, the phenomenon is prevented whereby the load moves up when it touches the ground.

BRIEF DESCRIPTIONS OF THE DRAWINGS

FIG. 9*a* shows a result if a constant b is 0.

FIG. 9*b* shows a result if a constant b is 30.

Figure 10:
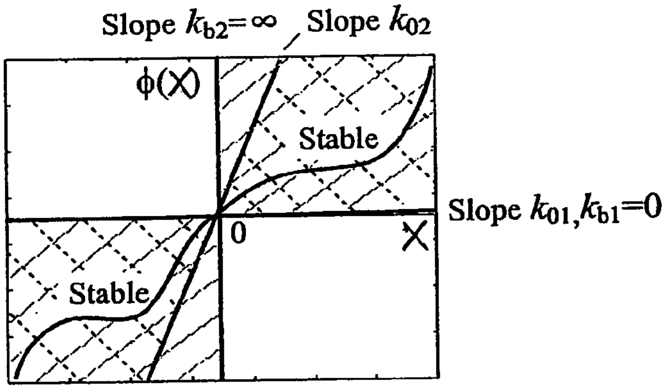

FIG. 10 is a drawing that shows inputs to a nonlinear element $\phi(x)$, and that shows stable areas.

Figure 11:
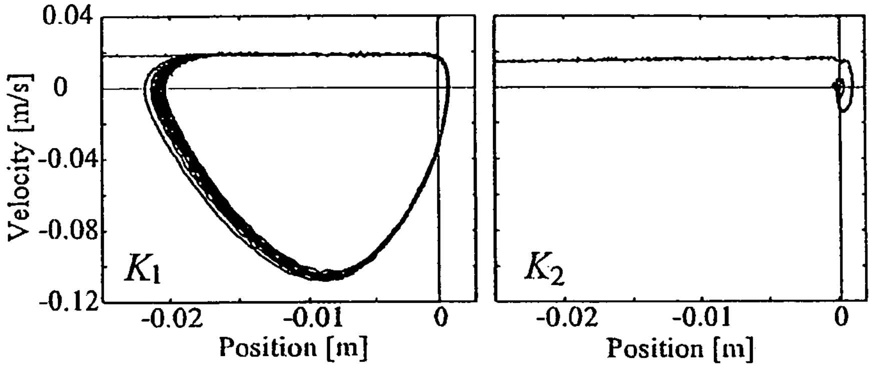

FIG. 11 is a drawing that shows restricting limit cycles by a phase plane ($K_1$ has limit cycles, but $K_2$ has no limit cycles).

Figure 12:
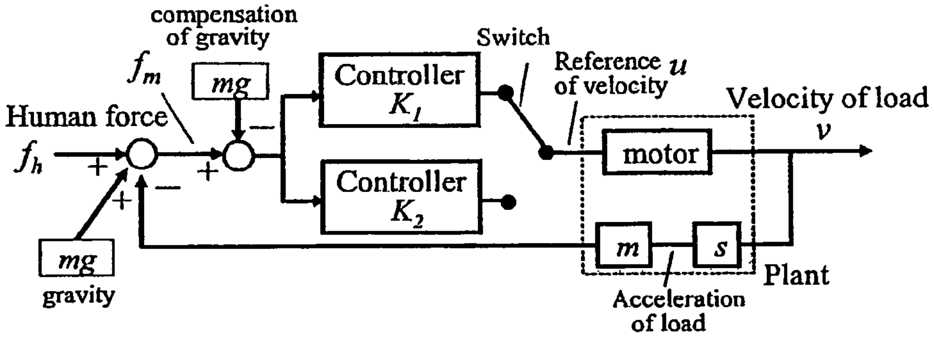

FIG. 12 is a block diagram of a controller for switching.

Figure 13:
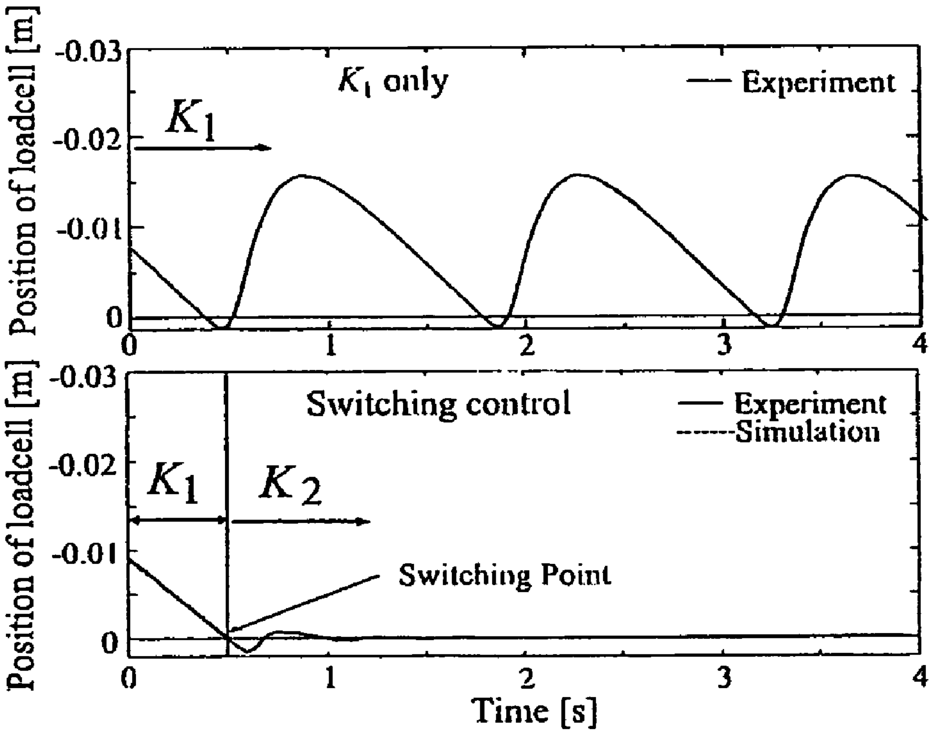

FIG. 13 is an example of restricting limit cycles by switching from $K_1$ to $K_2$.

DESCRIPTION OF A PREFERRED EMBODIMENT

Figure 1:
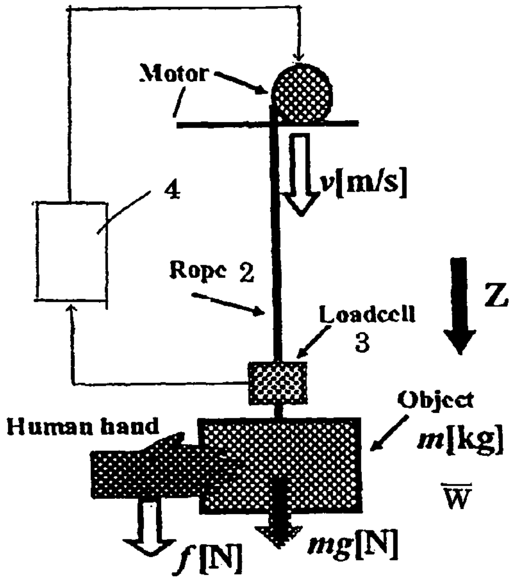
FIG. 1 is a schematic diagram of an embodiment of this invention.

Now, based on drawings we discuss an embodiment that applies this invention to the hoist that is provided to an overhead traveling crane. In FIG. 1, the hoist has a servo motor 1 of which the output shaft is directly connected to an axis of rotation of a drum to wind up a rope (not shown). The lower end of the rope 2 that has been let down from the drum has a load cell 3 as a means for measuring the force applied to the rope 2. At the lower end of the load cell 3, a load W for lifting is hung by a hook (not shown). The load cell 3 is electrically connected to a controller means 4. The controller means 4 has a computer as an arithmetic part that calculates the speed and the direction of the servo motor 1 based on the value measured by the load cell 3. It outputs data on the signal to the servo motor 1 to have it operate based on the value calculated by the computer.

The computer of the controller means 4 has a feature of a first controller means, a feature of a second controller means, and a feature of a switching means. The feature of the first controller means is one that calculates the speed and the direction of the servo motor 1 based on the value that is measured by the load cell 3, and it outputs the data on the signal for driving to the servo motor 1. The feature of the second controller means is one that obtains data on the stable condition in which the input and output signals for driving the servo motor 1 in the forward and the reverse direction are stable when the load W touches the ground, using Popov's criterion for stability as a criterion for nonlinear stability. The feature of the switching means causes the first controller means to be replaced by the second controller means, at the right time, namely, when the value measured by the load cell 3 becomes less than a threshold.

Now we discuss the working of the hoist of this embodiment. If an operator pushes a load W that is hung by the rope 2 in the upward or downward direction, whichever he or she likes, the load cell 3 will measure the force that is applied to the rope 2 and sends data on the value measured by it to the controller means 4. Then the computer in the controller means 4 will carry out some calculations based on a principle described below so as to assist the operator using the hoist to lift the load W.

Figure 2:
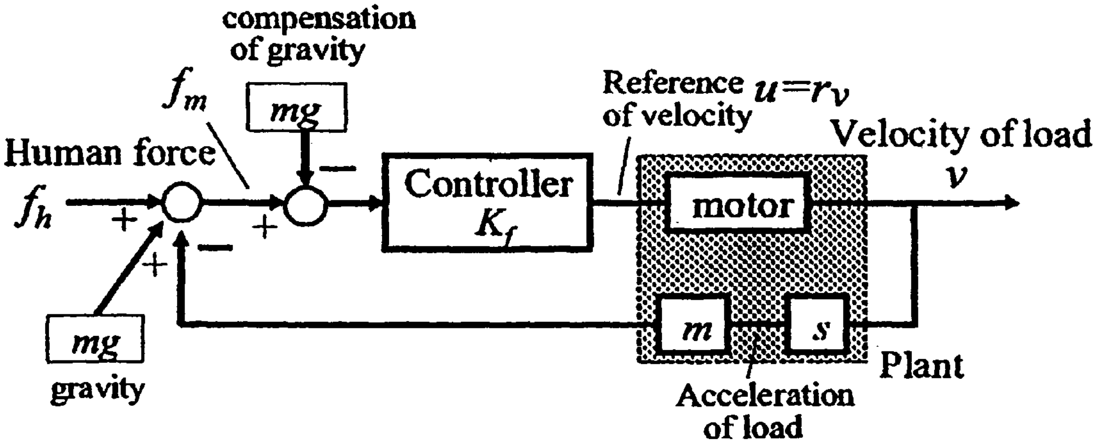
FIG. 2 is a block diagram of the control system of the embodiment of FIG. 1.

Namely, as in FIG. 2, the basic principle is that when an operator applies a force for controlling $f_h$ (N) to a load W, the load cell 3 detects a force $f_m$ (N) and a controller $K_f$ generates an input u (=$r_v$ [m/s], designated speed). Then a hoist causes the load to move up or down.

The mark m (kg) denotes the mass of the load W.

The positive direction of the Z axis is downward.

The work described above is carried out by the following principle. Namely, the below equation is used to calculate an adjusted lifting speed.

The adjusted lifting speed of the load is $v=r_v=K_f f_m$ (1)

The force $f_m$ that the load cell 3 detects is one that is subtracted from an apparent weight caused by the acceleration dv/dt of the load W from the force for controlling $f_h$. Accordingly, $$f_m=f_h \cdot m dv/dt \quad (2), \text{ and}$$

the load W has a speed for lifting that is represented by the following transfer function:

$$R_v(s)=K_f(s)F_h(s)/[1+mSK_f(s)]. \quad (3)$$

Therefore, by increasing the gain of the $K_f(s)$, the operator can lift the load by minimal force.

The mark s denotes the Laplace operator (1/s). The mark $F_h$ denotes the force for controlling (N).

Now, we define a coefficient of transformation $k_p$ (m/s/N) based on the force for controlling the speed for lifting as the parameters of the controller. The parameters cause the adjusted speed $r_v$ for lifting the load W to be $k_p f_h$, under a steady state.

The mark $k_p$ denotes the speed (m/s) per 1 (N) of the force for controlling.

This coefficient is decided by the request of a user. If the operator wants to decrease the speed for lifting the load W and to accurately position it, a low $k_p$ will be chosen. If he or she wants to lift with a high speed and low force, a large $k_p$ will be chosen.

Considering the frequency of the resonance of the hoist and the variations of its peak gain as a fluctuation of data, it is represented by the following equation (4).

$$\tilde{P}=P(I+\Delta) \quad (4)$$

The tilde over the P denotes an actual transfer function. The P denotes a normal transfer function, which is represented by the equation $P(s)=F_m(s)/R_v$=ms. The mark $\Delta$ denotes a fluctuation.

Figure 3:
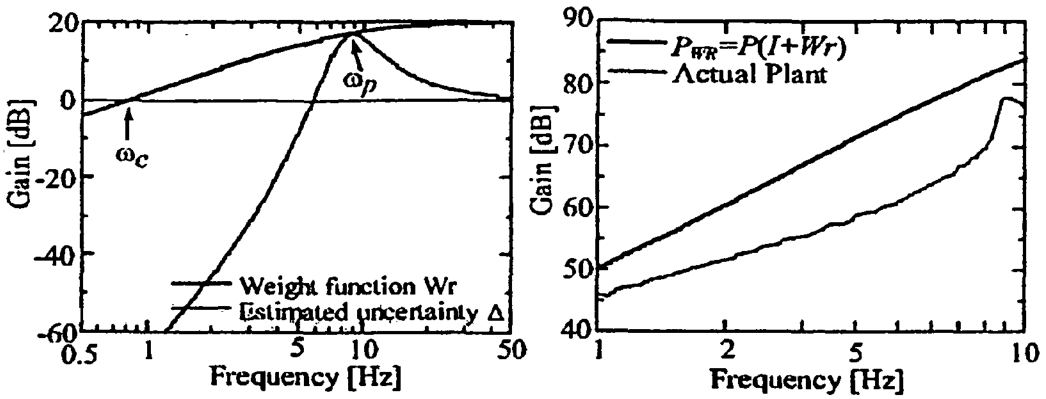
FIG. 3 is a graph that shows the relationship between errors in both modelling and estimates of the weight function.

FIG. 3 shows the relationship between errors in modelling and the estimates of the weight function. In FIG. 3, if the thin line in the left figure is an estimated transfer function, then, so as to stabilize the robustness, the function $W_r$, in which $|W_r|>|\Delta|$ is effective, will be obtained as $$W_r=\omega_p s/\omega_c(s+\omega_p) \tag{5}$$

and the thick line to the right of FIG. 3 will be obtained.

In FIG. 3, the $\omega_c$ (rad/s) is an angular frequency crossing the zero level. The $\omega_p$ (rad/s) is a frequency in which the Δ is at the peak.

Figure 4:
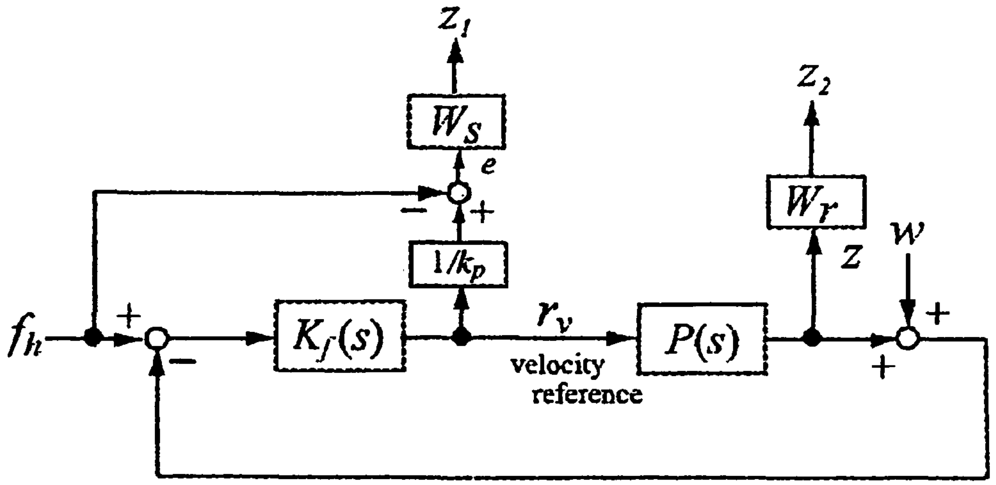
FIG. 4 is a block diagram of a problem of a mixed sensitivity.
Figure 5:
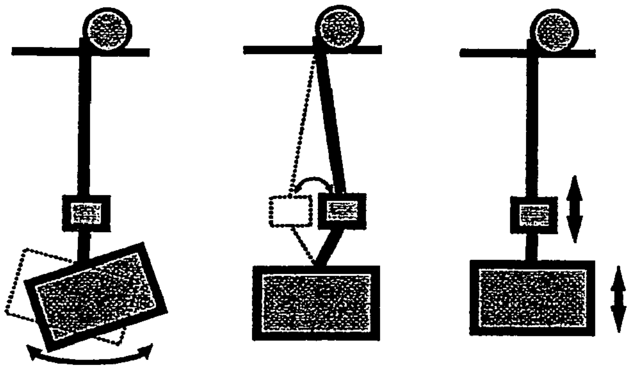
FIG. 5 is a schematic diagram of an example of high-order frequency modes of the embodiment of FIG. 1.

A block diagram for controlling the problem of a mixed sensitivity is shown in FIG. 4. The transfer function between w and z of this system is a complementary sensitivity function. The condition for robust stability is $\|Twz_2\|\infty<1$. This formula includes a calculation on the weight function $W_r$.

Accordingly, the required controller is formulated as the following equation (6).

$$\text{minimize}\|T_{wz_1}\|_2$$

$$\text{subject to}\|T_{wz_2}\|\infty<1 \tag{6}$$

The transfer function $Twz_1$ between w (=$f_h$) and $z_1$ corresponds to the difference between the force for controlling $f_h$ and the speed $r_v$ of the load. The purpose of this calculation means is to design a controller $K_f$. By the controller, the speed reaches a steady speed $k_p$ (m/s/N) as soon as possible when a stair-like change of the force for controlling occurs. Therefore, the weight function $W_s$ is determined by the following equation (7).

$$W_s=1/s \tag{7}$$

The controller $K_f$ is obtained as follows.

Since the sum of the orders of the weight functions $W_r$, $W_s$, and the normal transfer function P(s) is two, the most appropriate controller has a second order. Accordingly, the construction of the controller is represented as the following equation (8).

$$K_f=k_p(as^2+bs+c)/(s^2+2\zeta\omega_n s+\omega_n^2) \tag{8}$$

The marks a and b denote constants. The mark c denotes a variable. The mark denotes a Laplace operator (1/s). The mark ζ denotes a damping coefficient. The mark $\omega_n$ denotes a natural angular frequency.

From the viewpoint of robust stability, a=0 is presumed.

To comply with the equation $v=k_p f$ under a steady state, a variable c is obtained as follows.

$$\lim_{s\to 0} sT_{wv_r}(s)\frac{f}{s}=k_p cf/\omega_n^2=k_p f \tag{9}$$

$$c=\omega_n^2$$

Accordingly, an analytical solution of the controller is as follows.

$$K_f k_p(bs+\omega_n^2)/(s^2+2\zeta\omega_n s+\omega_n^2) \tag{10}$$

The equation (3), which is a transfer function between the force for controlling $f_h$ of an operator and the speeds of a load W, and the equation (10) of the controller, provide a transfer function between the force for controlling $f_h$ and speeds of the load W as follows.

$$\begin{cases} T_{vf_h}(s)=\dfrac{k_p}{\alpha}\dfrac{bs+\omega_n^2}{s^2+2\zeta_b\omega_b s+\omega_b^2} \\ \alpha=1+k_p mb \\ \zeta_b=\left(\zeta+\dfrac{1}{2}k_p m\omega_n\right)\Big/\sqrt{\alpha} \\ \omega_b=\omega_n\big/\sqrt{\alpha} \end{cases} \tag{11}$$

Figure 6:
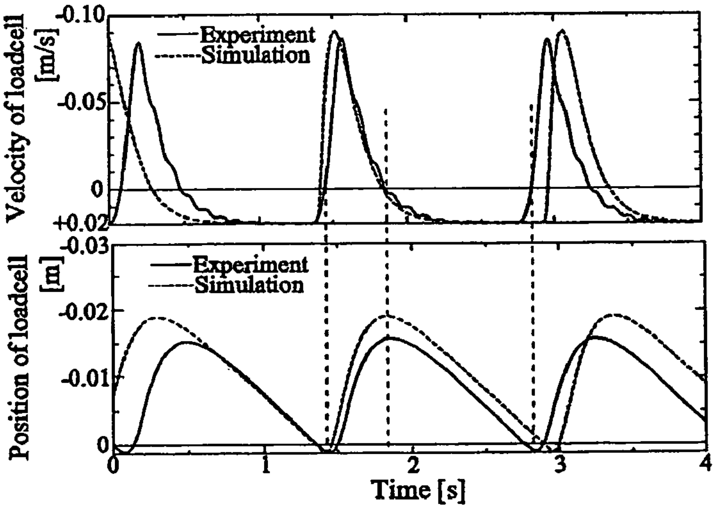
FIG. 6 is an example of the observation of limit cycles.

A hoist of the prior art, which is made with enhanced robustness and responsiveness, has a problem of a limit cycle. Namely, when the load W touches the ground, it moves up and down. FIG. 6 shows the position of a load W when a force of 10 (N) is continuously applied to a load W, whose weight is 30.3 (kg). The dotted line denotes the result of a simulation. The parameters used in this experiment are shown in the following table 1. The positive direction of the position is downward.

TABLE 1

Parameters of Controllers $K_1$ and $K_2$

| Controller Names | $K_1$ | $K_2$ |
|---|---|---|
| $f_{h0}$[N] | 10.0 | |
| $k_p$[m/s/N] | 0.002 | |
| m[kg] | 30.3 | |
| $\omega_n$[rad/s] | 10.0 | |
| ζ | 0.7 | 10.0 |
| b | 0 | 30 |

FIG. 6 shows that the limit cycle has a period of 1.8 (s) and an amplitude of 21.0 (mm). It shows that the result is close to that of the simulation.

A cause of the limit cycle may possibly be that the value measured by the load cell 3 rapidly decreases because the rope 2 becomes loose when the load W touches the ground. At the controller $K_f$, the force caused by gravity is subtracted. Therefore, if the value detected by the load cell 3 rapidly decreases when the load W touches the ground, the computer of the controller means 4 determines that a force in the upward direction has been caused, and the hoist will pull up the load.

Figure 7:
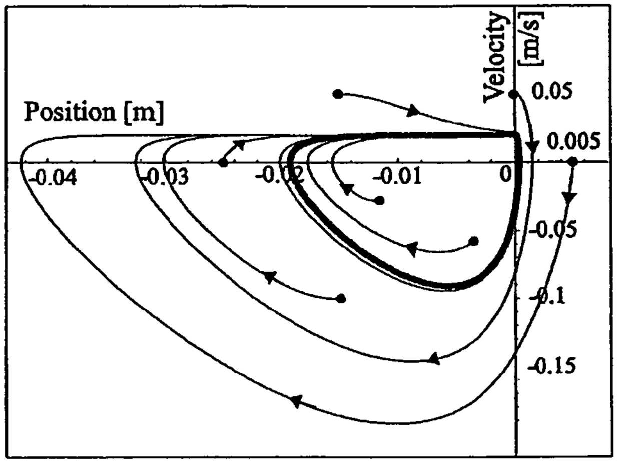
FIG. 7 is a phase plane showing limit cycles from a simulation.

FIG. 7 shows a phase plane showing limit cycles from a simulation. The upper half of the drawing shows that a motor 1 moves the hoist down. Its lower half shows that a motor 1 moves the hoist up. FIG. 7 shows that the limit cycles will converge to a certain locus regardless of the system's initial condition.

Figure 8:
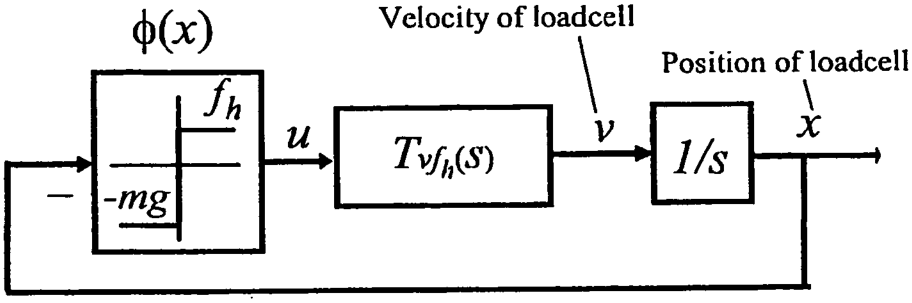
FIG. 8 shows a situation by a block diagram in which the touching of the ground occurs at x=0.

FIG. 8 shows a situation by a block diagram in which the load touches the ground at x=0. The equation (11) and the block diagram in FIG. 8 provide a motion equation of the closed-loop system as in the following equation (12).

$$x^{(3)}(t)+2\zeta_b\omega_b\ddot{x}(t)+\omega_b^2\dot{x}(t)=\frac{k_p}{\alpha}(\omega_b^2\phi(x)+b\dot{\phi}(x)) \tag{12}$$

$$\phi(x)=\begin{cases} f_h(t)(x<0) \\ -mg(x>0) \end{cases}$$

The mark x denotes the position of a load cell 3. The mark x(n) denotes a n-th-order derivative. The equation (12) shows that the hoist comprises a linear differential equation and a nonlinear part φ(x). The nonlinear part φ(x) is a step function of which the value changes based on the value of the x.

The relationship between an input signal to start a manipulation and the position x is shown by the following equation (13).

$$T_{xfh}(s)=T_{vfh}(s)/s \tag{13}$$

Then a determination is made of the conditions at which the input and output signals of the hoist are stable, so as to restrict the limit cycle, using Popov's criterion for stability.

The nonlinear portion complies with $0 \leqq x\phi(x) \leqq k$, $\phi(0)=0$. Popov's criterion for stability is used so as to easily determine if a system is stable when it has nonlinear elements.

Popov's criterion for stability is the following equation (14).

$$Re[T_{xfh}(j\omega)]-q\omega Im[T_{xfh}(j\omega)]+1/k>0 \tag{14}$$

The mark q can be an arbitrary value of $q \geqq 0$.

By this equation (14), on the real axis of a complex plane, the $\mathrm{Re}[T_{xfh}(j\omega)]$ is plotted. On the imaginary axis of the complex plane, $\omega \mathrm{Im}[T_{xfh}(j\omega)]$ is plotted. The locus of ω is Popov's locus.

Figure 9:
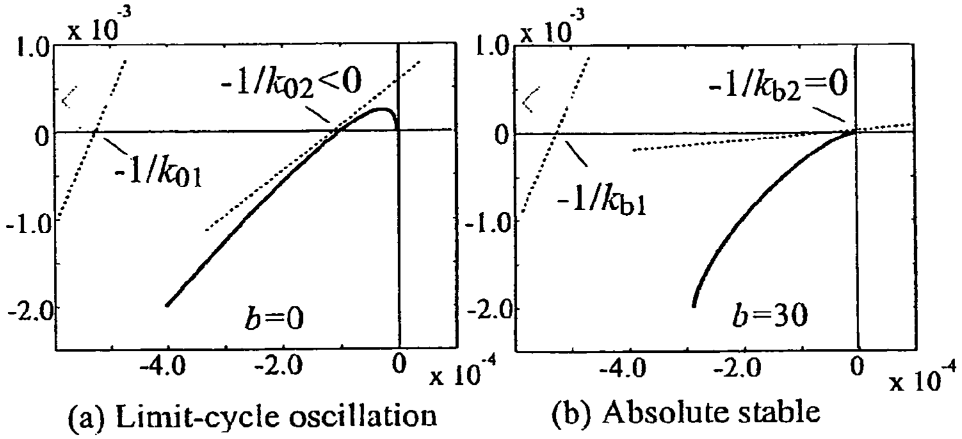

FIG. 9*a* shows the result when the constant b is 0. FIG. 9*b* shows the result when the constant b is 30. The line that has a slope of 1/q (an arbitrary value) and crosses the real axis at the point −1/k is referred to as Popov's line. These are shown in FIG. 9.

The marks $k_{01}$ and $k_{b1}$ denote minimum values when the constant b is 0 and when it is 30, respectively. The marks $k_{02}$ and $k_{b2}$ denote maximum values when the constant b is 0 and when it is 30 respectively. The marks $-1/k_{02}$, $-1/k_{b2}$, $-1/k_{01}$, and $-1/k_{b1}$ denote intercepts with the real axis when the constant b is 0 and when the constant b is 30. Popov's locus, if it is on the right side of Popov's line, shows a sufficient condition to be stable.

In FIG. 9*a*, when the constant b is 0, the condition in which Popov's locus resides on the right side of Popov's line, i.e., the condition that is sufficient for the system to be stable and generates no limit cycle, is that the intercept of Popov's line on the X-axis is between $-1/k_{01}$ and $-1/k_{02}$. Namely, the slope of the nonlinear part φ(x) is between $k_{01}$ and $k_{02}$. In this regard, since $-1/k_{01}$ is −∞, $k_{01}$ is 0.

As above, it turns out that the stability of the system depends on the slope of the nonlinear part φ(x).

Also, in FIG. 10, the area shown by dotted lines is the area in which the stability is ensured at the constant b=0. Thus, even if the nonlinear part φ(x) behaves as shown by a solid line, the system will be stable.

In a system such as in FIG. 8, such as this hoist, the value of the nonlinear part φ (x) was changed from −mg to $f_h$ at x=0. So the gradient of the change is k=∞. Therefore, a system having the constant b=0 was unstable, and it generated a limit cycle.

Then the stable condition of a system was determined as follows. Namely, since the maximum slope of the nonlinear part φ(x) at which the system is stable is kb2=∞, the intercept of Popov's line on the real axis is its original point. Also, the imaginary part of the equation (14) converges to 0 when ω→∞. Accordingly, if the imaginary part of the equation (14) is a negative value other than that of the original point, it will comply with $-1/k_{b2}=0$, i.e., $k_{b2}=\infty$, as shown in FIG. 9*b*. Thus, the stable condition is determined by the following equation (15).

$$\begin{aligned}\omega \mathrm{Im}[T_{xf_h}(j\omega)] &= \frac{k_p(-2\zeta_b\bar{b}\omega_b\omega^2+\alpha\omega_b^2\omega^2-\omega_b^4)}{(\omega_b^2-\alpha\omega^2)^2+4\zeta_b^2\omega_b^2\omega^2} \\ &= \frac{k_p\omega_n}{\alpha}\,\frac{\omega^2(\omega_n-2\zeta b)-\omega_n^3/\alpha}{(\omega_b^2-\alpha\omega^2)^2+4\zeta_b^2\omega_b^2\omega^2} \leq 0\ \forall\ \omega\end{aligned} \tag{15}$$

Since the denominator of equation (15) is always positive, the numerator must be negative, to comply with this equation. The condition can be represented by $\omega_n-2\zeta b \leqq 0$ for an arbitrary ω.

Accordingly, the stable condition of the hoist for an arbitrary force $f_h(t)$ and gravity mg is obtained by the following equation (16)

$$b \geqq \omega_n/2\zeta \tag{16}$$

As an example, the stable condition that complies with the equation (16) at b=30 is shown in FIG. 9*b*. By this example, it turns out that Popov's locus exists in the right side of Popov's line, from $-1/k_{b1}=-\infty$ to $-1/k_{b2}=0$, i.e., in the area from $k_{b1}=0$ to $k_{b2}=\infty$. Accordingly, in the area shown by dotted lines in FIG. 10, no matter how the system behaves, the system will be stable and the limit cycle will be prevented.

Experimental Example

We experimented with the hoist as in FIG. 1 under the conditions as in Table 1.

The controller that has a constant b=0, in which a limit cycle occurs, is shown by K1. The controller that complies with the equation (16), i.e., the stable condition, is shown by K2. All results of the experiment are shown in a phase plane in FIG. 11. The results show that the controller $K_2$ gets the limit cycle to converge very quickly.

In this experiment, in a short time the controller $K_2$ was able to get the limit cycle to attenuate. However, since there is a problem in that the controller $K_2$ cannot quickly respond, an efficient transportation of the load W is prevented. Thus, as in FIG. 12, by switching the controllers $K_1$ and $K_2$, the efficient transportation and the prevention of the limit cycle are both carried out. The switching is carried out just at the time the force sensed by the load cell 3 becomes less than a threshold when the load W touches the ground. Thus, before touching the ground, the controller $K_1$ is applied, and after touching it, the controller $K_2$ is applied.

The upper drawing in FIG. 13 shows the result when only the controller $K_1$ is applied. The lower drawing shows the result when a switching controller is used as the switching means. The results of the experiment show that after switching the controllers, the limit cycle gradually attenuates, and oscillations with an amplitude of 0.2 mm continue. The results of the experiment show that it turns out that the amplitude of the limit cycle is attenuated to one hundredth of that of the prior art. Thus, the switching controller can realize the efficient transportation of the load W and the prevention of the limit cycle.

What is claimed is:

1. A control system of a lifting device that controls the rotation of a servo motor so that an operator can move a load in a direction and at a speed that he or she desires by applying a force for controlling to the load, wherein the load is hoisted up or down or maintains its position by means of a rope that is wound up or down by the rotation of the servo motor in the forward or the reverse direction, the system comprising:

a means for measuring a total force that measures a force that is applied at the lower part of the rope caused by a force for controlling of the operator, the mass of the load, and the acceleration of the load, a first controller means in which the arithmetic part computes the direction and the speed of the servo motor based on the force that is measured by the means for measuring, and outputs a signal to the servo motor to have it operate, a second controller means that comprises an arithmetic part, wherein the arithmetic part determines a stable condition using a criterion for nonlinear stability, under which condition, when the load touches the ground, the input and output signals of the servo motor, which motor rotates in the forward and the reverse direction, are stable, and the arithmetic part computes the direction and the speed of the servo motor, and outputs a signal to the servo motor to have it operate, and a switching means that replaces the first controller means with the second controller means, at the right time, namely, when the value that is measured by the means for measuring becomes less than the threshold.

2. The control system of the lifting device of claim 1, wherein the arithmetic part stores the data on a controller $K_1$, which is expressed by the equation $K_f=k_p(b_s+\omega_n^2)/(s^2+2\zeta\omega_n s+\omega_n^2)$, and a controller $K_2$, which complies with the conditions of stability $b \geqq \omega_n/2\zeta$, and at the arithmetic part, the controller $K_1$ computes a prescribed speed for lifting in a minimum time based on the information from the means for measuring a force, which information is that of the total force caused by the force applied by the operator, the mass of the load, and the acceleration of the load, and wherein the controller $K_1$ sends instructions for driving to the servo motor, and then at the right time, namely, when the value that is measured by the means for measuring becomes less than the threshold, the controller $K_1$ is replaced by the controller $K_2$ by instructions from the switching means, wherein, the mark $k_p$ denotes a coefficient of transformation (m/s/N), the mark $\omega_n$ denotes a natural angular frequency (rad/s), the mark s denotes a Laplace operator (1/s), and the mark $\zeta$ denotes a damping coefficient.

3. The control system of the lifting device of claim 1, wherein the criterion for nonlinear stability is Popov's criterion for stability.

* * * * *